United States Patent [19]

Traut

[11] 4,080,018
[45] Mar. 21, 1978

[54] FIXED RETAINER ROLLING CONTACT BEARING

[76] Inventor: Earl W. Traut, 8040 Palm Lake Dr., Orlando, Fla. 32811

[21] Appl. No.: 635,781

[22] Filed: Nov. 28, 1975

Related U.S. Application Data

[62] Division of Ser. No. 414,150, Nov. 9, 1973, Pat. No. 3,937,537.

[51] Int. Cl.² ............................................. F16C 19/20
[52] U.S. Cl. .................................... 308/200; 308/202
[58] Field of Search ...................... 308/200, 199, 209

[56] References Cited

U.S. PATENT DOCUMENTS

| 852,462 | 5/1907 | Sevbert | 308/200 |
| 1,282,888 | 10/1918 | Lippincott | 308/200 |
| 1,976,078 | 10/1934 | Maisel | 308/200 |

*Primary Examiner*—Richard A. Bertsch

[57] ABSTRACT

Radial and axial bearing devices in which loads are transmitted from a race through a series of circularly disposed rotating elements, and thence through a second series of rotating elements to a second race; the second series of rotating elements being generally roller-shaped and including ends which roll on retainer rings, the retainer rings being fastened to the first race.

7 Claims, 4 Drawing Figures

U.S. Patent    March 21, 1978    4,080,018
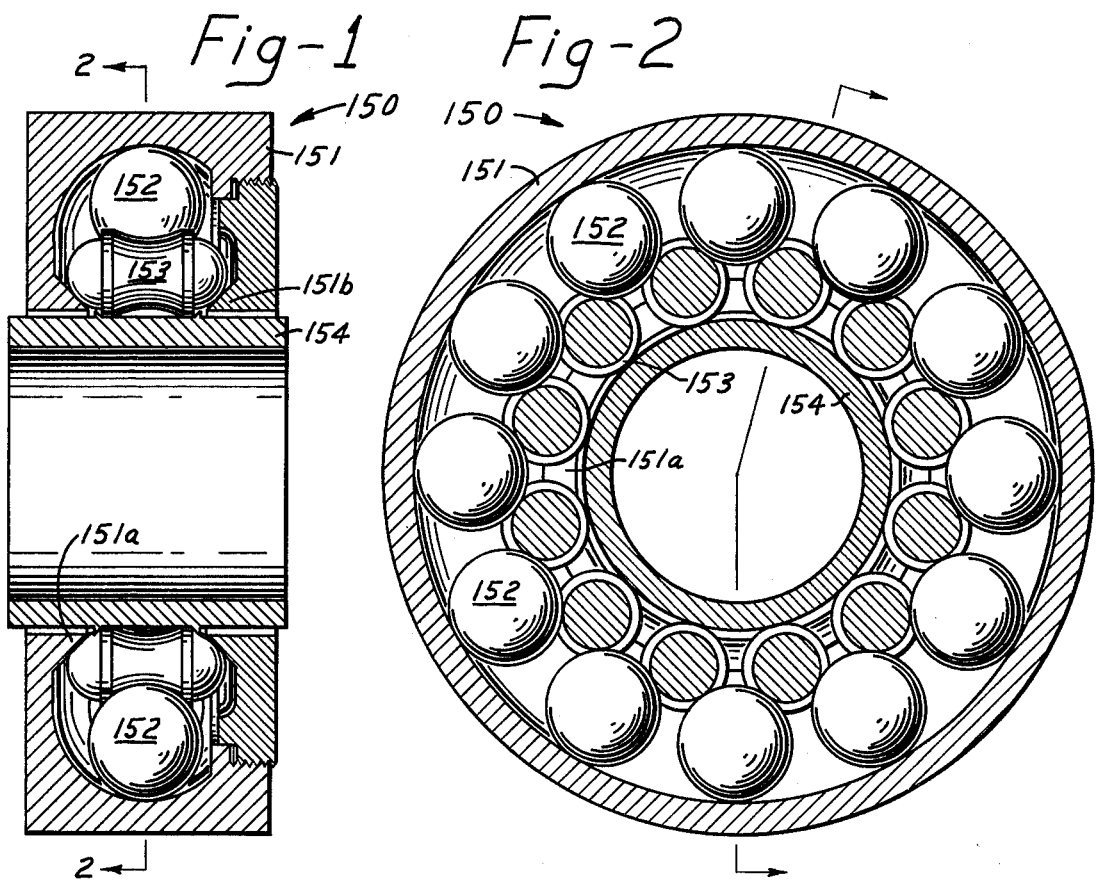
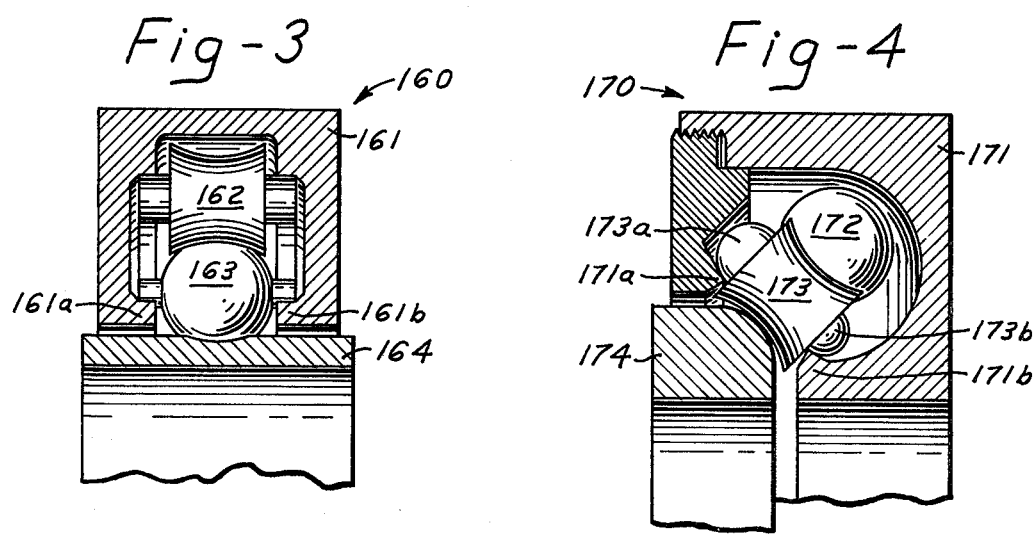

FIXED RETAINER ROLLING CONTACT BEARING

This is a division of application Ser. No. 414,150, filed Nov. 9, 1973, U.S. Pat. No. 3,937,537.

BACKGROUND OF THE INVENTION

In typical ball or roller bearings, loads are transmitted from one bearing race through a series of rolling elements to a second bearing race. These rolling elements are in sliding contact with each other or with a cage, and the resulting friction is undesireable in that it causes wear and necessitates the provision of lubrication and internal clearances. In some bearings sliding friction is eliminated by providing one or two additional sets of rolling elements, as in U.S. Pat. No. 116,795 issued to B. C. Baker, U.S. Pat. No. 413,446 issued to R. W. Hent and U.S. Pat. No. 3,365,254 issued to A. L. Nasvytis; but these bearings are either excessively complex or their rotating elements move at excessive speeds.

SUMMARY OF THE INVENTION

The invention provides fixed retainer rolling contact bearings including a bearing race, major rotating elements engaging the inner surface of this bearing race, minor rolling elements for positioning the major rolling elements, and retainers for positioning the minor rolling elements. The retainers are affixed to the bearing race. The minor rotating elements also roll against a second bearing race. All of these elements are in rolling contact with each other.

Accordingly, it is an object of the present invention to provide an improved rolling contact bearing without sliding friction.

Another object of the invention is to provide a rolling contact bearing wherein there are zero clearances between components, thus providing for exact centering of rotating elements with zero displacement due to clearances.

Other objects of this invention will appear from the following description and appended claims, reference being had to the accompanying drawings forming a part of this specification wherein like reference characters designate corresponding parts in the several views.

FIG. 1 is a vertical section view of a radial load rolling contact bearing using two sets of rotating elements, one set comprising balls and the other set comprising rollers, in accordance with one embodiment of the invention;

FIG. 2 is a vertical sectional view of FIG. 1 taken along lines 2—2 and looking in the direction of the arrows;

FIG. 3 is a vertical section view of the upper part of a device similar to that of FIG. 17, but with the rolling elements rearranged;

FIG. 4 is a vertical section view of the upper part of a bearing similar to that of FIG. 17, but with a combination radial load and axial load capability.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DETAILED DESCRIPTION

Rolling contact bearing 150 of FIGS. 1 and 2 is a radial load rolling contact bearing having two sets of rotating elements. The radially outward set of rotating elements comprises balls in rolling contact with the outer race, and the radially inward set is rollers which are alternately interposed and in rolling contact with the outer set and with the inner race. Two retaining races affixed to the outer race serve to hold the rollers of the second set radially outwards in postion against the balls of the first set. One of the retaining races is adjustably threaded. Device 150 includes outer race 151, which contacts balls 152, which in turn are in rolling contact with rollers 153. Rollers 153 are in rolling contact with inner race 154. Retaining rings 151a and 151b are integral with outer race 151 and contact hemispherical axial extensions of rollers 153 to hold them radially outwards.

It should be noted that all elements in FIG. 17 are at all times in rolling contact, provided the dimensions of the components are according to this formula: $151L/151S = 153L/153S$, where; $151L$ = the diameter of the inner periphery of outer race 151, $151S$ = the diameter of retaining rings 151a and 151b where they contact rollers 153, $153L$ = the diameter of the central portion of rollers 153, $153S$ = the diameter of the ends of rollers 153 where they contact retaining rings 151a and 151b.

FIG. 3 depicts another device 160 which is similar to that of FIG. 17 except that the two sets of rolling elements are interposed and terete axial extensions have been added to the balls. Device 160 is composed of outer race 161, which is in rolling contact with spools 162, which have balls 163 interposed between them. Balls 163 roll in a shallow groove in inner race 164 and have axial extensions which roll on the outer periphery of retaining rings 161a and 161b and are held radially outward thereby.

In the device 170 of FIG. 4, the outer race 171 contacts balls 172 which are interspersed between and contact the broad portions of rollers 173. The rounded ends 173a and 173b of rollers 173 contact retaining rings 171a and 171b. Ring 171a is affixed to outer race 171 and retaining ring 171b is integral with outer race 171. The device 170 is a combination radial load and axial load bearing.

I claim:

1. A rolling contact bearing comprising:
    a first bearing race,
    two retainer rings,
    said retainer rings being affixed to said first bearing race,
    a second bearing race,
    two series of rotating elements,
    the first of said series of rotating elements contacting only said first bearing race and second said series of rotating elements,
    said second series of rotating elements serving to hold said first series of rotating elements in position against said first race,
    the rotating elements of said second series being generally roller-shaped,
    said second series of rotating elements being held in position against said first series by said retainer rings and being in contact only therewith and with said second bearing race.

2. The rolling contact bearing as claimed in claim 1 in which the ratio of the diameter of the inner periphery of said first bearing race to the contact diameter of said retainer rings is equal to the ratio of the central diameter of said roller-shaped elements to the contact diameter of the ends of said roller-shaped elements, so as to assure rolling contact only.

3. The rolling contact bearing as claimed in claim 1 in which said first series of rotating elements comprises balls.

4. The rolling contact bearing as claimed in claim 1 in which said first series of rotating elements comprises generally roller-shaped rotating elements.

5. The rolling contact bearing as claimed in claim 1 in which said first bearing race is located radially outwards of said second bearing race, so as to describe a radial load bearing.

6. The rolling contact bearing as claimed in claim 1 in which said first bearing race is located radially outwards of said second bearing race and is also axially displaced from same, so as to describe a combination radial load and axial load bearing.

7. The rolling contact bearing as claimed in claim 1 in which at-least one of said retainer rings is affixed to said first bearing race by screw threads, so as to provide means of adjusting the internal clearance in said bearing.

* * * * *